(No Model.)

G. H. CLARK.
PNEUMATIC WHEEL TIRE.

No. 601,705. Patented Apr. 5, 1898.

Witnesses:
Arthur V. Randall.
Mary E. Foster.

Inventor:
George H. Clark,
by B. J. Noyes
Atty.

UNITED STATES PATENT OFFICE.

GEORGE H. CLARK, OF BOSTON, MASSACHUSETTS.

PNEUMATIC WHEEL-TIRE.

SPECIFICATION forming part of Letters Patent No. 601,705, dated April 5, 1898.

Application filed September 21, 1897. Serial No. 652,454. (No model.)

*To all whom it may concern:*

Be it known that I, GEORGE H. CLARK, of Boston, county of Suffolk, and State of Massachusetts, have invented an Improvement in Pneumatic Wheel-Tires, of which the following description, in connection with the accompanying drawings, is a specification, like letters on the drawings representing like parts.

This invention has for its object to improve and simplify the construction of pneumatic wheel-tires and to so construct the same that the tire when inflated will be approximately egg-shaped in cross-section, with the smaller end at the tread side of the tire.

The invention consists in inclosing an inflatable air-tube in an expansive sheath, which latter may be formed of a strip of fabric cut off on the bias and wrapped around said tube, the long side edges of said expansive strip being connected together or joined by suitable means, and in providing at the tread side of said expansible sheathed air-tube a non-extensible circular protecting-strip which is made segmental in cross-section, such a strip preventing expansion of the sheathed air-tube at the tread side of the tire, and consequently causing said tube to expand laterally, thereby producing an egg-shaped tire; also, in providing at the tread side of said expansive sheathed air-tube a non-extensible circular protecting-strip having as a coöperative part of it a circular strip of cork segmental in cross-section and composed of two or more strips of cork having scarfed ends, secured together; also, in constructing a non-extensible circular protecting-strip for pneumatic wheel-tires composed of two or more strips of cork having scarfed ends, secured together, made segmental in cross-section, and a non-expansive strip of fabric secured to said segmental strip.

Figure 2:
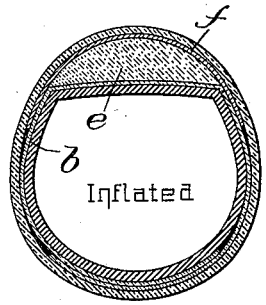
Figure 1:
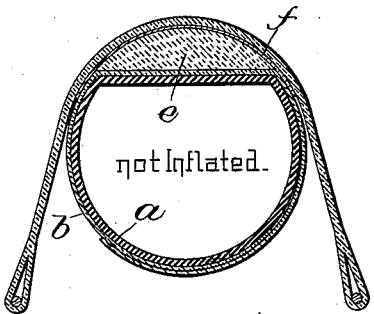
Figure 4:
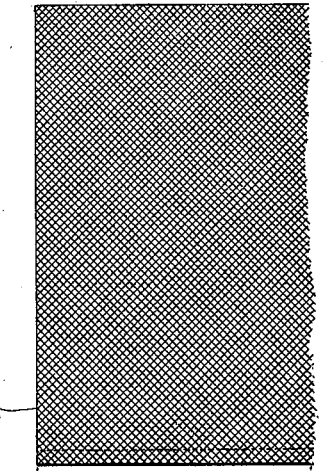
Figure 6:
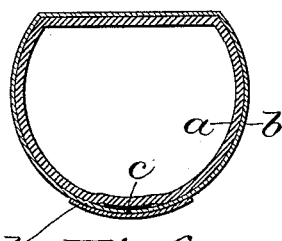
Figure 3:
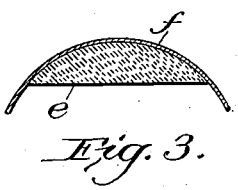
Figure 5:
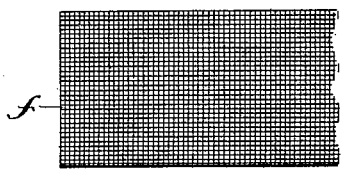
Figure 8:
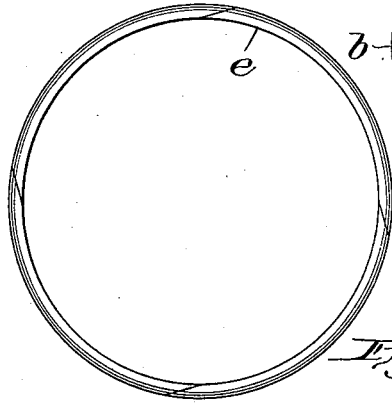

Figure 1 shows in cross-section a pneumatic wheel-tire embodying this invention, said tire not being inflated; Fig. 2, a similar cross-section of the tire shown inflated, but with a different outer covering. Fig. 3 is a cross-sectional detail of the non-extensible protecting-strip which I may employ; Fig. 4, a detail of a portion of a strip of fabric cut off on the bias and forming the expansive sheath or covering for the air-tube; Fig. 5, a detail showing a portion of the non-expansive strip of fabric which forms a coöperative part of the non-extensible protecting-strip at the tread side of the sheathed air-tube; Fig. 6, a cross-sectional detail showing the air-tube and its expansive sheath thereon, and Fig. 7 a similar cross-sectional detail showing a modified form of joint connecting the edges of the expansive sheath for the air-tube; Fig. 8, a detail of a portion of the non-extensible protecting-strip.

Figure 7:
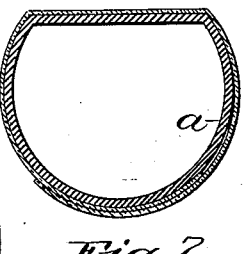

*a* represents the air-tube, which is made of rubber and of a size slightly less in cross-section than it is desired it shall assume when inflated. Such tube may be formed upon a mandrel, if desired. *b* represents a sheath which contains or incloses said air-tube. This sheath *b* is made expansible, so as to expand with the air-tube when the latter is inflated. I find in practice that such a sheath may be made of fabric by cutting it off on the bias, as represented in Fig. 3, and said strip, instead of being wound spirally upon the air-tube, as usual, is laid lengthwise along on said air-tube and wrapped about it. The longitudinal side edges of the expansive strip *b* are brought together, as shown in Fig. 6, and upon the inside a narrow strip of rubber *c* is provided which joins said side edges together. This narrow strip *c* may be applied first to one of the longitudinal edges of the strip *b*, as shown in Fig. 3, and then the other edge of said strip is brought into juxtaposition to the aforesaid edge and secured to said narrow strip *c*. Outside of said expansive sheath and opposite the strip *c* a narrow strip *d* of non-expansive fabric is applied, such strip being cut lengthwise the piece instead of on the bias, and said non-expansive strip *d* not only assists in connecting the edges of said strip *b*, but also prevents said strip from expanding at such point. The joint thus formed is on the inside or rim side of the tire, and hence lies upon or against the rim or felly of the wheel, and by providing a non-expansive strip which will prevent the sheath from expanding at such point the tire is less liable to become loosened from the rim, and thereby creep. I prefer such manner of connecting the edges of the strip *b* more particularly because of the efficiency, but said edges may be connected by merely overlapping them, as shown in Fig. 7. A non-extensible protecting-strip is provided at the tread side of the tire, which, as herein shown, consists of the strips e and f, secured together.

The strip e, which forms a coöperative part of the non-extensible protecting-strip, is preferably composed of cork; yet it may be composed of any equivalent material, and in Fig. 8 the strip e is shown as circular and composed of four pieces or strips of cork segmental in cross-section and formed or provided with scarfed ends, said strips being secured together to form a continuous circle. The strip f, which also forms a coöperative part of said non-extensible protecting-strip, is composed of a non-expansive strip of fabric which is attached to the protecting-strip e, and said strip f is made wider than the said protecting-strip e, to which it is attached, so that its edges may project considerably beyond the edges of said protecting-strip. The non-expansive strip f may be cut off the piece lengthwise, as represented in Fig. 8. The strip e f thus produced is segmental in cross-section, serves to protect the tube a from being easily punctured, is non-extensible, and continuous. The strip e f is placed at the tread side of the sheathed tube and cemented thereto and secured in the process of vulcanization.

The tire thus constructed will present an expansible sheathed tube having means at the rim and tread sides thereof to prevent it from expanding at such points, and consequently it will bulge more or less at the sides between said restrained portions, as shown in Fig. 2, and its widest diameter will be brought below the center, or nearer the rim than the tread.

The outer face of the cork protecting-strip is curved transversely corresponding to the arc of a circle of substantially the same diameter as the diameter of the non-inflated air-tube, (see Fig. 1,) and when said air-tube is inflated and its sides bulged outwardly, as above set forth, said protecting-strip will project and will result in producing a tire approximately egg-shaped in cross-section, with the small end at the tread side of the tire.

The expansive strip of fabric b will or may be treated with rubber or with a rubber compound, and so also may be the non-expansive strip f, and all of the parts will be vulcanized together.

It will be seen that the air-tube and its sheath and the protecting-strip e f are all vulcanized together independent of the outer covering or jacket.

I claim—

1. A pneumatic wheel-tire comprising an inflatable air-tube, an expansive sheath of fabric containing it, and a non-extensible circular protecting-strip, segmental in cross-section, at the tread side of said sheathed tube, all of said parts being vulcanized together and producing, when inflated, an egg-shaped tire, substantially as described.

2. In a pneumatic wheel-tire, an inflatable air-tube, an expansive sheath containing it, a non-extensible circular protecting-strip at the tread side of said sheathed tube, comprising essentially a circular strip of cork, segmental in cross-section, and composed of two or more cork strips scarfed at the ends and secured together, and an outer covering for the tire, substantially as described.

3. A pneumatic wheel-tire comprising an inflatable air-tube, contained within an expansive sheath, a non-extensible protecting-strip at the tread side of said sheathed tube, composed of a circular strip of cork, segmental in cross-section and a non-extensible strip of fabric secured thereto, all of said parts being vulcanized together, substantially as described.

4. A protecting-strip for pneumatic wheel-tires consisting of a circular strip of cork, segmental in cross-section, and composed of two or more cork strips scarfed at the ends and secured together, and a non-expansive strip of fabric secured to said segmental strip, substantially as described.

In testimony whereof I have signed my name to this specification in the presence of two subscribing witnesses.

GEORGE H. CLARK.

Witnesses:
B. J. NOYES,
MARY E. FOSTER.